(12) United States Patent
Bower et al.

(10) Patent No.: US 11,196,752 B2
(45) Date of Patent: Dec. 7, 2021

(54) MULTIFACTOR AUTHENTICATION FOR SECURE MANAGEMENT OF DATA CENTER ASSETS FROM A MOBILE DEVICE

(71) Applicant: LENOVO Enterprise Solutions (Singapore) PTE. LTD., New Tech Park (SG)

(72) Inventors: Fred A. Bower, Durham, NC (US); Caihong Zhang, Shanghai (CN)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 390 days.

(21) Appl. No.: 16/253,720

(22) Filed: Jan. 22, 2019

(65) Prior Publication Data

US 2020/0236116 A1 Jul. 23, 2020

(51) Int. Cl.
*H04L 29/06* (2006.01)
*G06K 19/07* (2006.01)
*H04W 12/06* (2021.01)

(52) U.S. Cl.
CPC ........ *H04L 63/107* (2013.01); *G06K 19/0723* (2013.01); *H04L 63/083* (2013.01); *H04L 63/0853* (2013.01); *H04W 12/06* (2013.01)

(58) Field of Classification Search
CPC ..... H04L 63/10; H04L 63/101; H04L 63/102; H04L 63/107; H04L 63/083; H04L 63/0853; G06K 19/0723; H04W 12/06; H04W 12/08; H04W 12/104; H04W 12/63
See application file for complete search history.

(56) References Cited

U.S. PATENT DOCUMENTS

| | | | |
|---|---|---|---|
| 7,769,394 B1 * | 8/2010 | Zhu | H04M 1/72463 455/456.1 |
| 7,788,183 B2 | 8/2010 | Romney | |
| 8,893,252 B1 * | 11/2014 | Bharghavan | H04K 3/45 726/11 |
| 10,037,689 B2 * | 7/2018 | Taylor | G08G 1/096844 |
| 10,771,458 B1 * | 9/2020 | Xia | H04L 63/0853 |
| 2013/0225282 A1 * | 8/2013 | Williams | G07F 17/3241 463/29 |
| 2017/0132168 A1 * | 5/2017 | Ahmed | G06F 13/4068 |
| 2017/0195339 A1 * | 7/2017 | Brown | H04M 1/72463 455/456.1 |

(Continued)

*Primary Examiner* — Malcolm Cribbs
(74) *Attorney, Agent, or Firm* — Kunzler Bean & Adamson; Bruce R. Needham

(57) ABSTRACT

An apparatus for multifactor identification of a mobile device for access to data processing devices within a secured data center includes a processor of a secured server and a memory that stores code executable by the processor. The code is executable by the processor to receive from a mobile device a request for authorization to access a data processing device within a secured data center, verify that user credentials received from the mobile device in conjunction with the authorization request match credentials of an authorized user, where the authorized user is authorized to access the data processing device, verify that the mobile device is in proximity to the data processing device, and authorize the mobile device to access the data processing device in response to verifying the user credentials match credentials of an authorized user and verifying that the mobile device is in proximity to the data processing device.

18 Claims, 6 Drawing Sheets

(56) References Cited

U.S. PATENT DOCUMENTS

2017/0213404 A1\* 7/2017 Sivalingam ............ H04W 12/08
2018/0103341 A1\* 4/2018 Moiyallah, Jr ...... G06F 3/04842
2018/0351956 A1\* 12/2018 Verma ................. G06F 21/6263

\* cited by examiner

MULTIFACTOR AUTHENTICATION FOR SECURE MANAGEMENT OF DATA CENTER ASSETS FROM A MOBILE DEVICE

FIELD

The subject matter disclosed herein relates to multifactor authentication within secured data facilities and more particularly relates to multifactor identification for use of a mobile device in a secured data center.

BACKGROUND

In modern data centers, which are often secure facilities, mobile devices are commonly introduced into secured data center environments, but typically are not allowed to communicate on a network within the secured data center due to security concerns. In some secured data centers, authorized users use dedicated mobile devices that do not leave the data center and have limited functionality. However, providing dedicated mobile devices to authorized users may be expensive and inefficient because authorized users typically have a personal mobile device.

BRIEF SUMMARY

An apparatus for multifactor identification of a mobile device for access to data processing devices within a secured data center is disclosed. A method and computer program product also perform the functions of the apparatus. The apparatus includes a processor of a secured server and a memory that stores code executable by the processor. The code is executable by the processor to receive from a mobile device a request for authorization to access a data processing device within a secured data center, verify that user credentials received from the mobile device in conjunction with the authorization request match credentials of an authorized user, where the authorized user is authorized to access the data processing device, verify that the mobile device is in proximity to the data processing device, and authorize the mobile device to access the data processing device in response to verifying the user credentials match credentials of an authorized user and verifying that the mobile device is in proximity to the data processing device.

A method for multifactor identification of a mobile device for access to data processing devices within a secured data center includes receiving from a mobile device a request for authorization to access a data processing device within a secured data center, verifying that user credentials received from the mobile device in conjunction with the authorization request match credentials of an authorized user, where the authorized user is authorized to access the data processing device, verifying that the mobile device is in proximity to the data processing device, and authorizing the mobile device to access the data processing device in response to verifying the user credentials match credentials of an authorized user and verifying that the mobile device is in proximity to the data processing device.

A program product for multifactor identification of a mobile device for access to data processing devices within a secured data center includes a computer readable storage medium that stores code executable by a processor. The executable code includes code to receive from a mobile device a request for authorization to access a data processing device within a secured data center, verify that user credentials received from the mobile device in conjunction with the authorization request match credentials of an authorized user, where the authorized user is authorized to access the data processing device, verify that the mobile device is in proximity to the data processing device, and authorize the mobile device to access the data processing device in response to verifying the user credentials match credentials of an authorized user and verifying that the mobile device is in proximity to the data processing device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
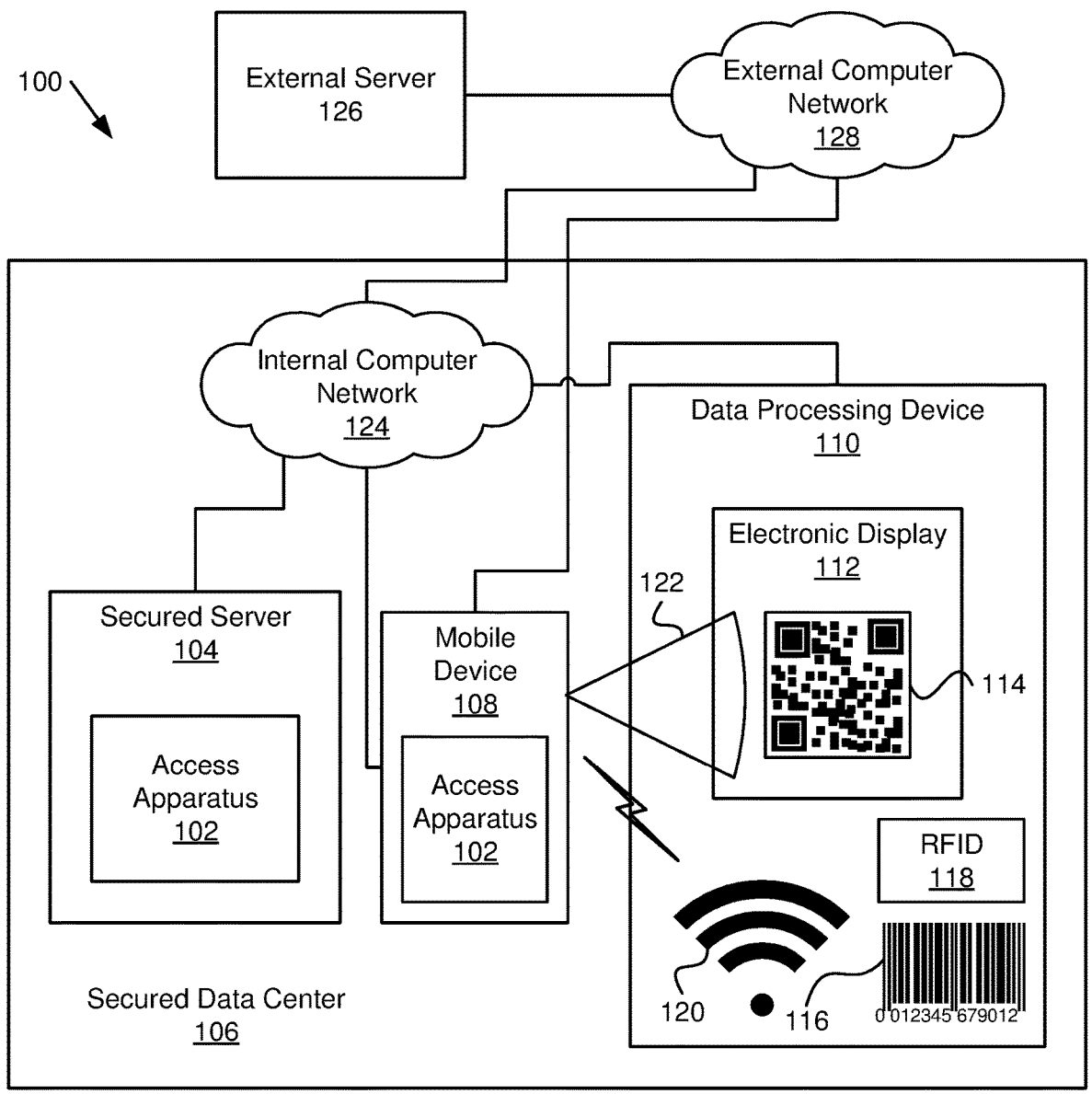
FIG. 1 is a schematic block diagram illustrating one embodiment of a system for multifactor identification of a mobile device for access to data processing devices within a secured data center.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for multifactor identification of a mobile device for access to data processing devices within a secured data center is disclosed. A method and computer program product also perform the functions of the apparatus. The apparatus includes a processor of a secured server and a memory that stores code executable by the processor. The code is executable by the processor to receive from a mobile device a request for authorization to access a data processing device within a secured data center, verify that user credentials received from the mobile device in conjunction with the authorization request match credentials of an authorized user, where the authorized user is authorized to access the data processing device, verify that the mobile device is in proximity to the data processing device, and authorize the mobile device to access the data processing device in response to verifying the user credentials match credentials of an authorized user and verifying that the mobile device is in proximity to the data processing device.

In one embodiment, verifying that the mobile device is in proximity to the data processing device includes receiving, from the mobile device, proximity information accessed at the data processing device, and verifying that the accessed proximity information is available at the data processing device. In another embodiment, the proximity information available at the data processing device is available on an electronic display. In another embodiment, the proximity information available at the data processing device is dynamic and changes over time.

In another embodiment, verifying that the mobile device is in proximity to the data processing device includes the mobile device connecting to a network available at the data processing device, where the network comprising a wireless network available at the data processing device or a wired connection to the data processing device. In a further embodiment, verifying that the mobile device is in proximity to the data processing device includes linking the mobile device to the network, receiving authorization data from the mobile device over the network, and/or verifying over the network that the user credentials received from the mobile device in conjunction with the authorization request match credentials of the authorized user. In another embodiment, the wireless network may be a wireless network with a range of a specified distance from the data processing device, a radio frequency identification ("RFID") tag readable by the mobile device, and/or a wireless network available within the secured data center, wherein a location of the mobile device within the secured data center is transmitted over the network.

In some embodiments, verifying that the mobile device is in proximity to the data processing device includes using information from a global positioning satellite ("GPS") to determine a location of the mobile device. In other embodiments, verifying user credentials received from the mobile device in conjunction with the authorization request match credentials of an authorized user includes receiving a username and a password from the mobile device and matching the username and password with the username and password of an authorized user, receiving a data token from the mobile device and using data from the data token to authenticate an authorized user, and/or receiving biometric data from the mobile device and matching the biometric data with corresponding biometric data of an authorized user.

In some embodiments, authorizing the mobile device to access the data processing device includes authorizing the mobile device for a period of time and/or authorizing the mobile device until the mobile device is beyond a perimeter. In some embodiments, authorizing the mobile device to access the data processing device includes limiting functionality of the mobile device. In other embodiments, limiting functionality of the mobile device may include limiting access to one or more applications running on or executable on the mobile device, stopping execution of one or more running applications on the mobile device, limiting access to one or more functions of the mobile device, and/or executing a limiting application on the mobile device that limits access an application running on the mobile device and/or a function of the mobile device.

In one example, authorizing the mobile device to access the data processing device includes starting an application that allows access and/or control of the data processing device. In other examples, the apparatus includes code executable on the processor to limit communication capability of the mobile device in response to authorizing the mobile device to access the data processing device, where limiting communication capability of the mobile device includes limiting communication between the mobile device and a devise outside of the secured data center.

A method for multifactor identification of a mobile device for access to data processing devices within a secured data center includes receiving from a mobile device a request for authorization to access a data processing device within a secured data center, verifying that user credentials received from the mobile device in conjunction with the authorization request match credentials of an authorized user, where the authorized user is authorized to access the data processing device, verifying that the mobile device is in proximity to the data processing device, and authorizing the mobile device to access the data processing device in response to verifying the user credentials match credentials of an authorized user and verifying that the mobile device is in proximity to the data processing device.

In some embodiments, verifying that the mobile device is in proximity to the data processing device includes receiving, from the mobile device, proximity information accessed at the data processing device, and verifying that the accessed proximity information is available at the data processing device and/or the mobile device connecting to a network available at the data processing device. The network is a wireless network available at the data processing device or a wired connection to the data processing device. In other embodiments, verifying user credentials received from the mobile device in conjunction with the authorization request match credentials of an authorized user includes receiving a username and a password from the mobile device and matching the username and password with the username and password of an authorized user, receiving a data token from the mobile device and using data from the data token to authenticate an authorized user, and/or receiving biometric data from the mobile device and matching the biometric data with corresponding biometric data of an authorized user.

In some embodiments, authorizing the mobile device to access the data processing device includes authorizing the mobile device for a period of time, authorizing the mobile device until the mobile device is beyond a perimeter, and/or limiting functionality of the mobile device. In other embodiments, the method includes limiting communication capability of the mobile device in response to authorizing the mobile device to access the data processing device, where limiting communication capability of the mobile device includes limiting communication between the mobile device and a device outside of the secured data center.

A program product for multifactor identification of a mobile device for access to data processing devices within a secured data center includes a computer readable storage medium that stores code executable by a processor. The executable code includes code to receive from a mobile device a request for authorization to access a data processing device within a secured data center, verify that user credentials received from the mobile device in conjunction with the authorization request match credentials of an authorized user, where the authorized user is authorized to access the data processing device, verify that the mobile device is in proximity to the data processing device, and authorize the mobile device to access the data processing device in response to verifying the user credentials match credentials of an authorized user and verifying that the mobile device is in proximity to the data processing device.

FIG. 1 is a schematic block diagram illustrating one embodiment of a system 100 for multifactor identification of a mobile device 108 for access to data processing devices 110 within a secured data center 106. The system 100, includes an access apparatus 102 in a secured server 104 of a secured data center 106, a mobile device 108, a data processing device 110 with an electronic display 112 displaying a code 114, a code 116 affixed to the data processing device 110, a radio frequency identification ("RFID") tag 118, a wireless connection 120, an internal computer network 124, an external server 126, and an external computer network 128, which are described in more detail below.

The system 100 includes an access apparatus 102 that receives from a mobile device 108 within the secured data center 106 an authorization request to access a data processing device 110. The access apparatus 102 verifies that user credentials from the mobile device 108 match those of an authorized user that has access to the data processing device 110. The access apparatus 102 verifies that the mobile device 108 is in proximity to the data processing device 110 and authorizes the mobile device 108 to access the data processing device 110. The access apparatus 102 is described in more detail below with regard to the apparatuses 200, 300 of FIGS. 2 and 3. Note that all or part of the access apparatus 102 may be located in the secured server 104, in the mobile device 108, in the data processing device 110, in a server (not shown) external to the secured data center 106, or other convenient location.

The system 100 includes one or more secured servers 104, which may be located in the secured data center 106 or another location. A secured server 104, in some embodiments, is used for authentication for authorized users and may also be used for controlling access to data processing devices 110 within the secured data center 106. Typically, a secured server 104 has some form of isolation and protection from external networks, hackers attempting to access the secured server 104 and other data processing devices 110 within the secured data center 106.

The secured server 104 may be a desktop computer, a workstation, a baseboard management controller ("BMC"), a mainframe computer, and the like. The secured server 104 may include one or more processors and may include wired or wireless capabilities to the data processing devices 110 within and exterior to the secured data center 106.

The system 100 may include one or more mobile devices 108 of a user that seeks to use the mobile device 108 to access a data processing device 110. A mobile device 108, in one embodiment, includes a processor and an operating system. For example, the mobile device 108 may be a cellular phone, a portable music player, a portable gaming device, a tablet or other device generally used for purposes other than access to the data processing device 110. The mobile device 108 may have an operating system typical of a smartphone or other portable electronic device, such as Windows®, iOS, Android™, etc. The mobile device 108 typically includes a wireless transmitter/receiver allowing the mobile device 108 to connect wirelessly to a network. In addition, the mobile device 108 may include one or more terminals for a wired connection to another device.

The system 100 includes one or more data processing devices 110 located within the secured data center 106. A data processing device 110 may be a desktop computer, a rack-mounted computer, a blade server, a BMC, storage area network ("SAN") controller, a rack-mounted device or controller, a data storage device, or other device common to a secured data center 106 that can be configured, controlled, commanded, etc. by an authorized user. In one embodiment, the data processing device 110 includes an electronic display 112. The electronic display 112 may be used along with input devices, such as a keyboard, mouse, etc. to interact with the data processing device 110. In another embodiment, the data processing device 110 is capable of displaying proximity information that may be used by the mobile device 108 to verify that the mobile device 108 is in proximity to the data processing device 110. For example, the proximity information may be a quick response ("QR") code 114, a bar code 116, etc. Other types of proximity information appearing on the electronic display 112 is described below with regard the apparatuses 200, 300 of FIGS. 2 and 3.

The data processing device 110 may also include other types of proximity information, such as a bar code 116, QR code 114, picture, etc. on the data processing device 110. The data processing device 110 may also include an RFID tag 118 or other form of electronic tag that is interacted with by a mobile device 108 when the mobile device 108 is near the data processing device 110.

In other embodiments, the data processing device 110 includes a connector for wired connection to the data processing device 110 where the connector is available to the mobile device 108 for connection. The connector may be to a wired network may be a local area network ("LAN"), a storage area network ("SAN") or other type of network that allows communication between the mobile device 108 and the data processing device 110.

In other embodiments, the data processing device 110 includes a wireless connection 120 capable of communicating with the mobile device 108 when the mobile device 108 is in proximity to the data processing device 110. The wireless connection 120 may employ a Wi-Fi network based on any one of the Institute of Electrical and Electronics Engineers ("IEEE") 802.11 standards. Alternatively, the wireless connection 120 may be a BLUETOOTH® connection, a near-field communication ("NFC") connection or the like. In addition, the wireless connection 120 and or RFID tag 118 may employ a RFID communication including RFID standards established by the International Organization for Standardization ("ISO"), the International Electrotechnical Commission ("IEC"), the American Society for Testing and Materials® (ASTM®), the DASH7™ Alliance, and EPC-Global™.

Alternatively, the wireless connection 120 may employ a ZigBee® connection based on the IEEE 802 standard. In one embodiment, the wireless connection 120 employs a Z-Wave® connection as designed by Sigma Designs®. Alternatively, the wireless connection 120 may employ an ANT® and/or ANT+® connection as defined by Dynastream® Innovations Inc. of Cochrane, Canada.

The wireless connection 120 may be an infrared connection including connections conforming at least to the Infrared Physical Layer Specification ("IrPHY") as defined by the Infrared Data Association® ("IrDA"®). Alternatively, the wireless connection 120 may be a cellular telephone network communication. All standards and/or connection types include the latest version and revision of the standard and/or connection type as of the filing date of this application. The wireless connection 120 is capable of determining if the mobile device 108 is in proximity to the data processing device 110 and may use triangulation, global positioning satellite ("GPS") technology, or other device locating technology to determine that the mobile device 108 is in proximity to the data processing device 110.

The system 100 includes an internal computer network 124 that connects at least the data processing device 110 to the secured server 104, and may also connect to the mobile device 108. The internal computer network 124 may be a wired network, a wireless network, a combination of networks, etc. The internal computer network 124, in some embodiments, is a secured network that includes firewalls and other security measures to prevent external access to unauthorized users. In some embodiments, the internal computer network 124 includes a connection to an external computer network 128. The connection between the internal computer network 124 and the external computer network 128 may be secured with a firewall, password protection and other security measure to keep unauthorized users from accessing the internal computer network 124. The internal computer network 124 may include one or more routers, switches, servers, cabling, etc.

The mobile device 108 is typically capable of connecting to an external computer network 128, which may then connect to an external server 126 or other computing device. For example, the external computer network 128 may include a cellular network, a LAN, a wide area network ("WAN"), the Internet, a combination of networks, etc. The mobile device 108 may have limited functionality for connecting and transmitting over the external computer network 128 after being authorized to access the data processing device 110.

Figure 2:
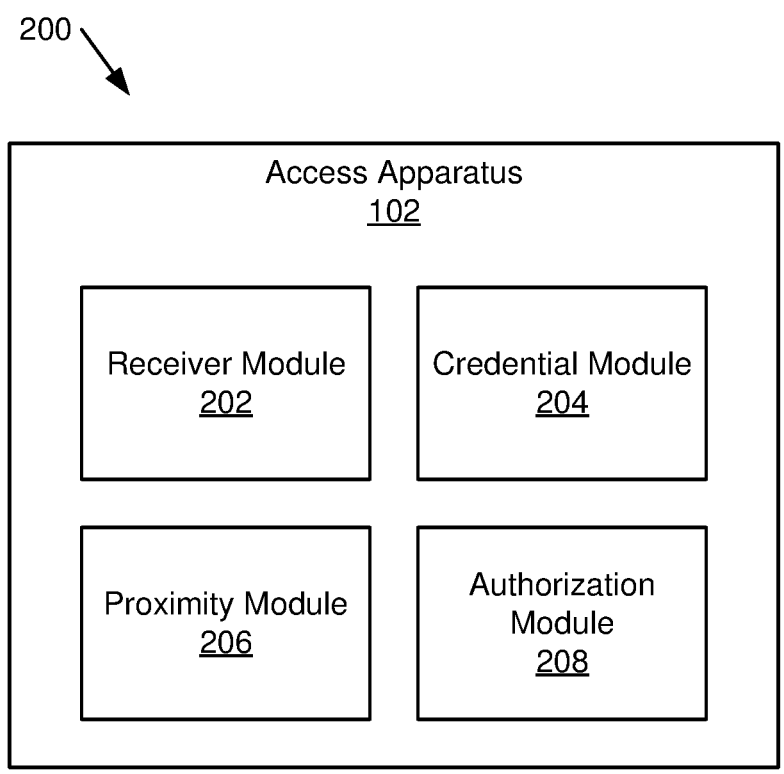
FIG. 2 is a schematic block diagram illustrating one embodiment of an apparatus for multifactor identification of a mobile device for access to data processing devices within a secured data center.

FIG. 2 is a schematic block diagram illustrating one embodiment of an apparatus 200 for multifactor identification of a mobile device 108 for access to data processing devices 110 within a secured data center 106. The apparatus 200 includes one embodiment of the access apparatus 102 with a receiver module 202, a credential module 204, a proximity module 206, and an authorization module 208, which are described below.

The apparatus 200 includes a receiver module 202 that receives from a mobile device 108 a request for authorization to access a data processing device 110 within a secured data center 106. For example, an authorized user, such as an information technology administrator, employee of the secured data center 106, technician, etc. may want to use a mobile device 108 to access a data processing device 110 within the secured data center 106 rather than through a typical keyboard and/or mouse. In some embodiments, the data processing device 110 is remote from the secured server 104 or other device that includes an electronic display, keyboard, mouse, etc.

The data processing device 110 may lack an electronic display or may have an electronic display 112 dedicated to displaying proximity information so that using a mobile device 108 to control the data processing device 110 provides convenience. The receiver module 202 may be in the secured server 104, the data processing device 110, or other device associated with the secured data center 106. The received request, in some embodiments, is in the form of accessing a login prompt. In other embodiments, the received request may include identifying information of the data processing device 110. For example, the identifying information may include a serial number, a model number, an assigned identifier, etc. associated with the data processing device 110. One of skill in the art will recognize other forms of a request for authorization to access the data processing device 110.

The apparatus 200 includes a credential module 204 that verifies that user credentials received from the mobile device 108 in conjunction with the authorization request match credentials of an authorized user, where the authorized user is authorized to access the data processing device 110. For example, the authorization request may be in the form of a username and password. In another embodiment, the credential module 204 sends a request for user credentials to the mobile device 108 in response to the authorization request. The user credentials may be in the form of a username and password, a data token, a fingerprint scan, a retina scan, a facial scan, or other biometric authorization data. The credential module 204 may then compare the received user credentials with stored credentials of authorized users to verify that the received user credentials match the credentials of an authorized user. In another embodiment, the mobile device 108 may read a finger print, may scan a retina, may receive a user name and password, etc. and may send a data token and the credential module 204 may verify validity of the data token in conjunction with accessing the data processing device 110 to verify credentials of an authorized user.

The credential module 204 may receive the user credentials from the mobile device 108 over the internal computer network 124, over a direct connection between the mobile device 108 and the data processing device 110, wirelessly, etc. The credential module 204 may receive the user credentials over two or more connected networks. For example, the mobile device 108 may transmit the user credentials over a wireless connection 120 to the data processing device 110, which may transmit the user credentials to the secured server 104 over the internal computer network 124. One of skill in the art will recognize other ways for the credential module 204 to verify that user credentials from the mobile device 108 match credentials of an authorized user of the data processing device 110.

The apparatus 200 includes a proximity module 206 that verifies that the mobile device 108 is in proximity to the data processing device 110. In one embodiment, the mobile device 108 in proximity to the data processing device 110 means that the mobile device 108 is within a certain radius of the data processing device 110. For example, the radius may be 10 feet, 5 feet, or another radius chosen by an administrator. In another embodiment, the mobile device 108 in proximity to the data processing device 110 may include the mobile device 108 being within the secured data center 106. In another embodiment, the mobile device 108 in proximity to the data processing device 110 means that the mobile device 108 is close enough to interact with proximity information of the data processing device 110, such as proximity information printed on or attached to the data processing device 110, proximity information displayed on an electronic display 112 of the data processing device 110, within a range of a wireless connection 120 of the data processing device 110, within a distance to interact with an RFID tag 118, etc.

For example, the mobile device may have a camera or other scanner that scans (depicted as 122) a QR code 114, bar code 116, a picture, etc. on the data processing device 110. Typically, the camera or other scanner of a mobile device 108 is capable of scanning a QR code 114, bar code 116, etc. when the mobile device 108 is within a few inches or feet of the data processing device 110, which may be considered in proximity to the data processing device 110.

Where the mobile device 108 connects to a wireless connection 120 of the data processing device 110 for proximity, the wireless connection 120 may be a short range wireless connection, such as BLUETOOTH®, NFC, RFID, ANT, ANT+, IrPHY, IrDA, etc. with a field strength such that the mobile device 108 must be close to the data processing device 110 for connection. In another embodiment where the mobile device 108 connects to a wireless connection 120 of the data processing device 110 for proximity, the wireless connection 120 may be a WiFi™ or other wireless local area network with a capability of determining a location of the mobile device 108 with respect to the data processing device 110, such as through triangulation, GPS, field strength, etc. and the proximity module 206 may determine proximity as a specified distance or radius from the data processing device 110.

In some embodiments, the mobile device 108 being within proximity of the data processing device 110 includes the mobile device 108 being close to the data processing device 110 during authentication and then being a further distance away after authorization. In another embodiment, the mobile device 108 being within proximity of the data processing device 110 includes the mobile device 108 being within a specified distance or radius of the data processing device 110 while authorized to access the data processing device 110. One of skill in the art will recognize other definitions of the mobile device 108 being within proximity of the data processing device 110.

The apparatus 200 includes an authorization module 208 that authorizes the mobile device 108 to access the data processing device 110 in response to verifying the user credentials match credentials of an authorized user and verifying that the mobile device 108 is in proximity to the data processing device 110. For example, the authorization module 208 may allow the mobile device 108 to access data on the data processing device 110 after authorization.

In another example, the authorization module 208 may allow the mobile device 108 to control the data processing device 110 after authorization. For instance, the authorized mobile device 108 may view settings, data, performance statistics, etc. In other instances, the authorized mobile device 108 may issue commands to the data processing device 110, may set parameters, etc. on the data processing device 110, and the like. By requiring both verification of user credentials and that the mobile device 108 is in proximity to the data processing device 110, the access apparatus 102 uses multifactor authentication to help ensure that a person with a mobile device 108 is both an authorized user and is close to the data processing device 110, which helps to prevent unauthorized access to data processing device 110 of the secured data center 106.

Figure 3:
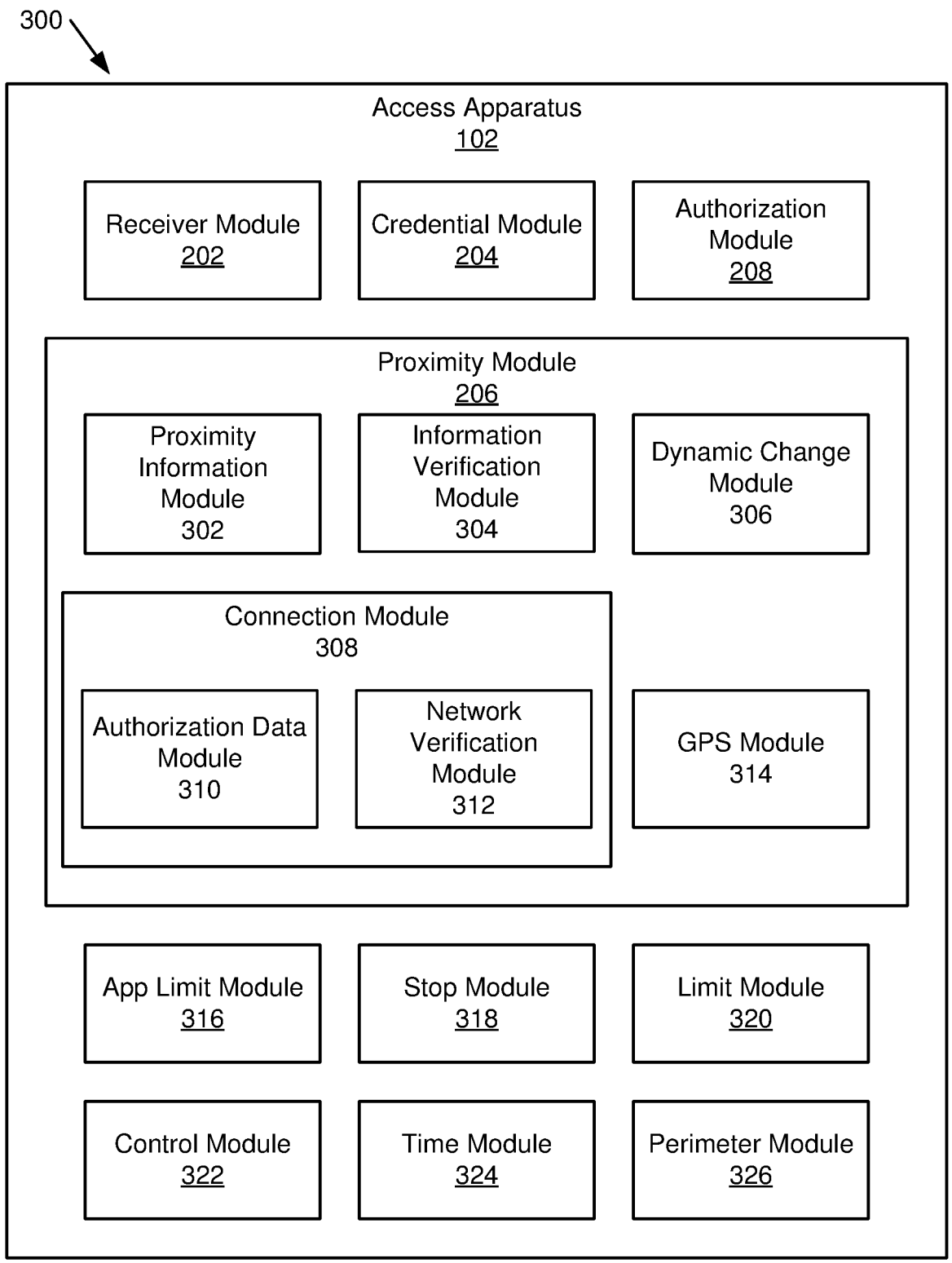
FIG. 3 is a schematic block diagram illustrating another embodiment of an apparatus for multifactor identification of a mobile device for access to data processing devices within a secured data center.

FIG. 3 is a schematic block diagram illustrating another embodiment of an apparatus 300 for multifactor identification of a mobile device 108 for access to data processing devices 110 within a secured data center 106. The apparatus 300 includes another embodiment of the access apparatus 102 with a receiver module 202, a credential module 204, a proximity module 206, and an authorization module 208, which are substantially similar to those described above in relation to the apparatus 200 of FIG. 2. The apparatus 300 may also include a proximity information module 302, an information verification module 304, dynamic change module 306, a connection module 308 with an authorization data module 310 and a network verification module 312, a GPS module 314, an app limit module 316, a stop module 318, a limit module 320, a control module 322, a time module 324 and/or a perimeter module 326, which are described below.

In some embodiments, the proximity module 206 of the apparatus 300 includes a proximity information module 302 that receives, from the mobile device 108, proximity information accessed at the data processing device 110 and an information verification module 304 that verifies that the accessed proximity information is available at the data processing device 110. For example, the mobile device 108 may scan proximity information at the data processing device 110 and the proximity information module 302 may receive the scanned proximity information from the mobile device 108.

The information verification module 304 verifies that the received proximity information is information at that is available at the data processing device 110. For example, each data processing device 110 may include unique proximity information such as a unique bar code 116, QR code 114, ID tag, picture, a word, a phrase, etc., which may be stored electronically. The information verification module 304 may compare the received proximity information with stored proximity information corresponding to data processing devices 110 of the secured data center 106. The information verification module 304 may return an identifier of a data processing device 110 when a match to stored proximity information is found and the proximity module 206 or information verification module 304 may determine if the identifier matches the data processing device 110 for which a user of the mobile device 108 is seeking access.

In another embodiment, the information verification module 304 may indicate that proximity is verified when the received proximity information matches stored proximity information for the data processing device 110 for which a user with the mobile device 108 seeks access. In one embodiment, the mobile device 108 returns scanned proximity information as scanned. In another embodiment, the mobile device 108 returns information derived from the scanned proximity information. For example, the mobile device 108 may scan a bar code 116 or QR code 114 and may transmit information encoded into the bar code 116 or QR code 114.

In one embodiment, the proximity module 206 of the apparatus 300 includes a dynamic change module 306 that changes the proximity information of the data processing device 110 periodically or randomly. For example, the dynamic change module 306 may periodically change a QR code 114 on an electronic display 112 of the data processing device 110 and may update stored proximity information associated with the data processing device 110 where the newly stored proximity information matches information encoded in the QR code 114. In another embodiment, the dynamic change module 306 stores a table of proximity information and changes the proximity information at the data processing device 110 on a schedule where table and displayed proximity information are synchronized.

Dynamically changing the proximity information at the data processing device 110 is advantageous to avoid a person scanning and storing proximity information located at a data processing device 110 and then attempting to use this information at a later time away from the data processing device 110 or outside the secured data center 106. Dynamically changing the proximity information adds further protection to the multifactor identification process of the access apparatus 102 for access to the data processing device 110. One of skill in the art will recognize other ways for the dynamic change module 306 to periodically or randomly change the proximity information at the data processing device 110 and associated stored proximity information.

In some embodiments, the proximity module 206 of the apparatus 300 includes a connection module 308 that connects to a network available at the data processing device 110. The network is a wireless network available at the data processing device 110 or a wired connection to the data processing device 110. In one example, the network is the wireless connection 120 described above and the connection module 308 connects or links the mobile device 108 to the data processing device 110 using the wireless connection 120, which signifies to the proximity module 206 that the mobile device 108 is in proximity to the data processing device 110. The wireless connection 120, in some embodiments, is a short range wireless connection so that a connection between the mobile device 108 and the data processing device 110 signifies that the mobile device 108 is in proximity with the data processing device 110.

For example, the wireless connection 120 may be over a WiFi network and a particular signal strength may be used to determine proximity. For example, the wireless connection 120 is of a BLUETOOTH® network, an NFC network, an ANT network, etc. with a very limited range. One of skill in the art will recognize other ways that the connection module 308 can establish a wireless connection 120 between the mobile device 108 and the data processing device 110 to establish proximity.

In some embodiments, the connection module 308 includes an authorization data module 310 that receives authorization data from the mobile device 108 over a network, such as the wireless connection 120 or a wired connection. For example, the mobile device 108 may have previously stored authorization data regarding connection to the network and the mobile device 108 may automatically communicate the authorization data to the authorization data module 310 to establish a wireless connection 120 or a wired connection to the network, which establishes proximity of the mobile device 108 to the data processing device 110.

In another embodiment, the connection module 308 includes a network verification module 312 that verifies over a network, such as the wireless connection 120 or a wired connection to the network, that the user credentials received from the mobile device 108 in conjunction with the authorization request received by the receiver module 202 match credentials of the authorized user. For example, the mobile device 108 may be close enough to the data processing device 110 to be in range of a wireless network of the data processing device 110 and make a connection and the mobile device 108 may send a request for authorization to access the data processing device 110 over the network along with user credentials. The credential module 204 may then verify that the user credentials match credentials of an authorized user and, because the credentials were received over a wired or wireless network of the data processing device 110, the proximity module 206, connection module 308 and/or network verification module 312 verifies that the mobile device 108 is in proximity with the data processing device 110.

In some embodiments, the proximity module 206 uses location information of the mobile device 108 available through the wireless connection 120 to determine that the connected mobile device 108 is in proximity with the data processing device 110. For example, the wireless connection 120 may use signal strength to determine mobile device 108 proximity to the data processing device 110. In another example, the wireless connection 120 is over a wireless network that includes multiple transmitters and is able to triangulate to locate the mobile device 108. In another embodiment, the connection module 308 includes a GPS module 314 that uses GPS data of the mobile device 108 received over the wireless connection 120 to establish a location of the mobile device 108 and proximity to the data processing device 110. For example, the mobile device 108 may have a GPS function and the GPS module 314 may request and receive the GPS data over the wireless connection 120.

In another embodiment, the connection module 308 establishes proximity of the mobile device 108 to the data processing device 110 by connecting the mobile device 108 to the data processing device 110 over a wired connection. For example, the wired connection may be a cable of limited length, which establishes proximity of the mobile device 108 to the data processing device 110.

In some embodiments, in response to authorizing the mobile device 108 to access the data processing device 110 includes limiting functionality of the mobile device 108. In one example, the apparatus 300 includes an app limit module 316 that limits access to one or more applications running on or executable on the mobile device 108. For example, the app limit module 316 may prevent a user of the mobile device 108 from accessing an email application, a text messaging application, a data storage application, etc. to prevent the user from sending sensitive data available to the mobile device 108 after accessing the data processing device 110. In another embodiment, the apparatus 300 includes a stop module 318 that stops execution of one or more running applications on the mobile device 108, for example, to prevent a user from using the one or more applications running on the mobile device 108. The stop module 318 may also stop an application on the mobile device 108 from being started.

In another embodiment, the apparatus 300 includes a limit module 320 that limits access to one or more functions of the mobile device 108. For example, the limit module 320 may prevent a user from accessing a function of the mobile device 108, such as enabling or using a cellular network, accessing an external computer network 128, or other function that may be a security risk. In another embodiment, the limit module 320 may execute a limiting application on the mobile device 108 that limits access applications to running or executable on the mobile device 108, a function of the mobile device 108, etc. The limiting application, in some embodiments, occupies the screen or electronic display of the mobile device 108 while preventing any other window, menu, data, etc. not pertaining to accessing the data processing device 110 from being accessed.

In some embodiments, the apparatus 300 includes a control module 322 that starts an access application that includes menus, options, functions, etc. pertaining to accessing the data processing device 110. For example, the access application may provide a menu of commands for accessing data on the data processing device 110. In one embodiment, the access application functions as a limiting application. One of skill in the art will recognize other functionality of the limiting application for accessing, controlling, etc. the data processing device 110.

In one embodiment, the apparatus 300 includes a time module 324 that authorizes the mobile device 108 to access to the data processing device 110 for a limited period of time after the authorization module 208 authorizes the mobile device 108 to access the data processing device 110. For example, the time module 324 may authorize the mobile device 108 for an hour, a half hour or other period of time. For example, a data center administrator may set the period of time for authorization. After the time period expires, the time module 324, in one embodiment, stops the mobile device 108 from accessing the data processing device 110. In other embodiments, the time module 324 may allow the access apparatus 102 to re-authorize the mobile device 108, for example, by allowing the credential module 204 to again receive user credentials and allowing the proximity module 206 to verify that the mobile device 108 is in proximity to the data processing device 110.

The apparatus 300, in some embodiments, includes a perimeter module 326 that stops the mobile device 108 from accessing the data processing device 110 in response to the mobile device 108 being no longer in proximity to the data processing device 110. For example, the perimeter module 326 may stop access when the mobile device 108 is no longer connected over the wireless connection 120 or over a wired connection to the data processing device 110. In another embodiment, the perimeter module 326 stops access of the mobile device 108 when the mobile device 108 is taken outside a perimeter, outside the secured data center 106, or beyond some other perimeter. For example, the GPS module 314 may monitor location data of the mobile device 108 and transmit the location data to the perimeter module 326 and the perimeter module 326 may then revoke access to the data processing device 110. In some embodiments, the time module 324 and the perimeter module 326 operate simultaneously.

Figure 4:
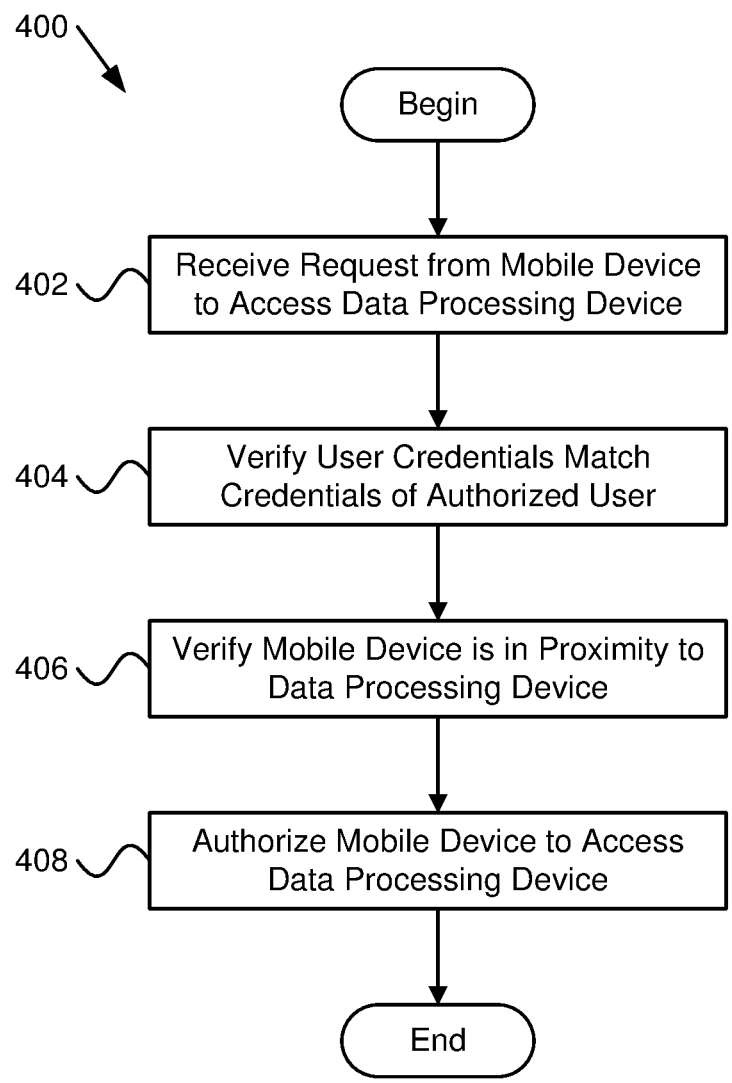
FIG. 4 is schematic flow chart diagram illustrating one embodiment of a method for multifactor identification of a mobile device for access to data processing devices within a secured data center.

FIG. 4 is a schematic block diagram illustrating one embodiment of a method 400 for multifactor identification of a mobile device 108 for access to data processing devices 110 within a secured data center 106. The method 400 begins and receives 402, from a mobile device 108, a request for authorization to access a data processing device 110 within the secured data center 106. The method 400 verifies 404 that user credentials received from the mobile device 108 in conjunction with the authorization request match credentials of an authorized user. The authorized user is authorized to access the data processing device 110. The method 400 verifies 406 that the mobile device 108 is in proximity to the data processing device 110 and authorizes 408 the mobile device 108 to access the data processing device 110 in response to verifying the user credentials match credentials of an authorized user and verifying that the mobile device 108 is in proximity to the data processing device 110, and the method 400 ends. The method 400 may be implemented, in some embodiments, by the receiver module 202, the credential module 204, the proximity module 206, and/or the authorization module 208.

Figure 5:
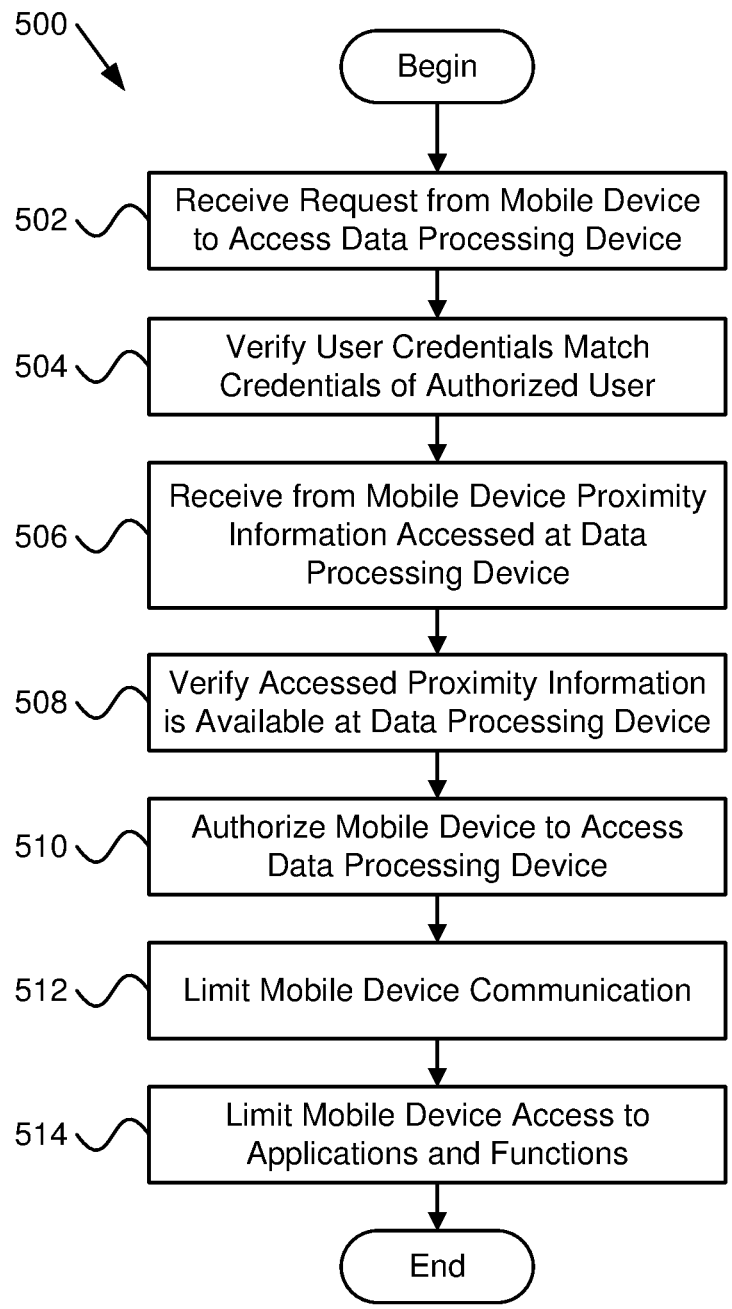
FIG. 5 is a schematic flow chart diagram illustrating another embodiment of a method for multifactor identification of a mobile device for access to data processing devices within a secured data center.

FIG. 5 is a schematic block diagram illustrating another embodiment of a method 500 for multifactor identification of a mobile device 108 for access to data processing devices 110 within a secured data center 106. The method 500 begins and receives 502, from a mobile device 108, a request for authorization to access a data processing device 110 within a secured data center 106. The method 500 verifies 504 that user credentials received from the mobile device 108 in conjunction with the authorization request match credentials of an authorized user.

The method 500 receives 506 from the mobile device 108 proximity information accessed at the data processing device 110. For example, the proximity information may be from a bar code 116, a QR code 114, an RFID tag 118, a picture, a word, a phrase, an identifier, etc. located at or on the data processing device 110. The method 500 verifies 508 that the accessed proximity information is available at the data processing device 110. For example, the method 500 may compare the received proximity information with stored proximity information associated with the data processing device 110 to determine if there is a match. The method 500 authorizes 510 the mobile device 108 to access the data processing device 110 in response to verifying 504 that the user credentials match credentials of an authorized user and verifying 508 that the accessed proximity information matches stored proximity information associated with the data processing device 110, which verifies that the mobile device 108 is in proximity to the data processing device 110.

The method 500, in one embodiment, limits 512 communication of the mobile device 108, for example communication with to the secured server 104, with the data processing device 110, and/or other devices of the secured data center 106 and may also prevent communication outside the secured data center 106. The method 500, in some embodiments, may also limit 514 access of the mobile device 108 to applications and functionality of the mobile device 108, and the method 500 ends. The method 500 may be implemented, in some embodiments, by the receiver module 202, the credential module 204, the proximity module 206, the authorization module 208, the proximity information module 302, the information verification module 304, the dynamic change module 306, the app limit module 316, the stop module 318, and/or the limit module 320.

Figure 6:
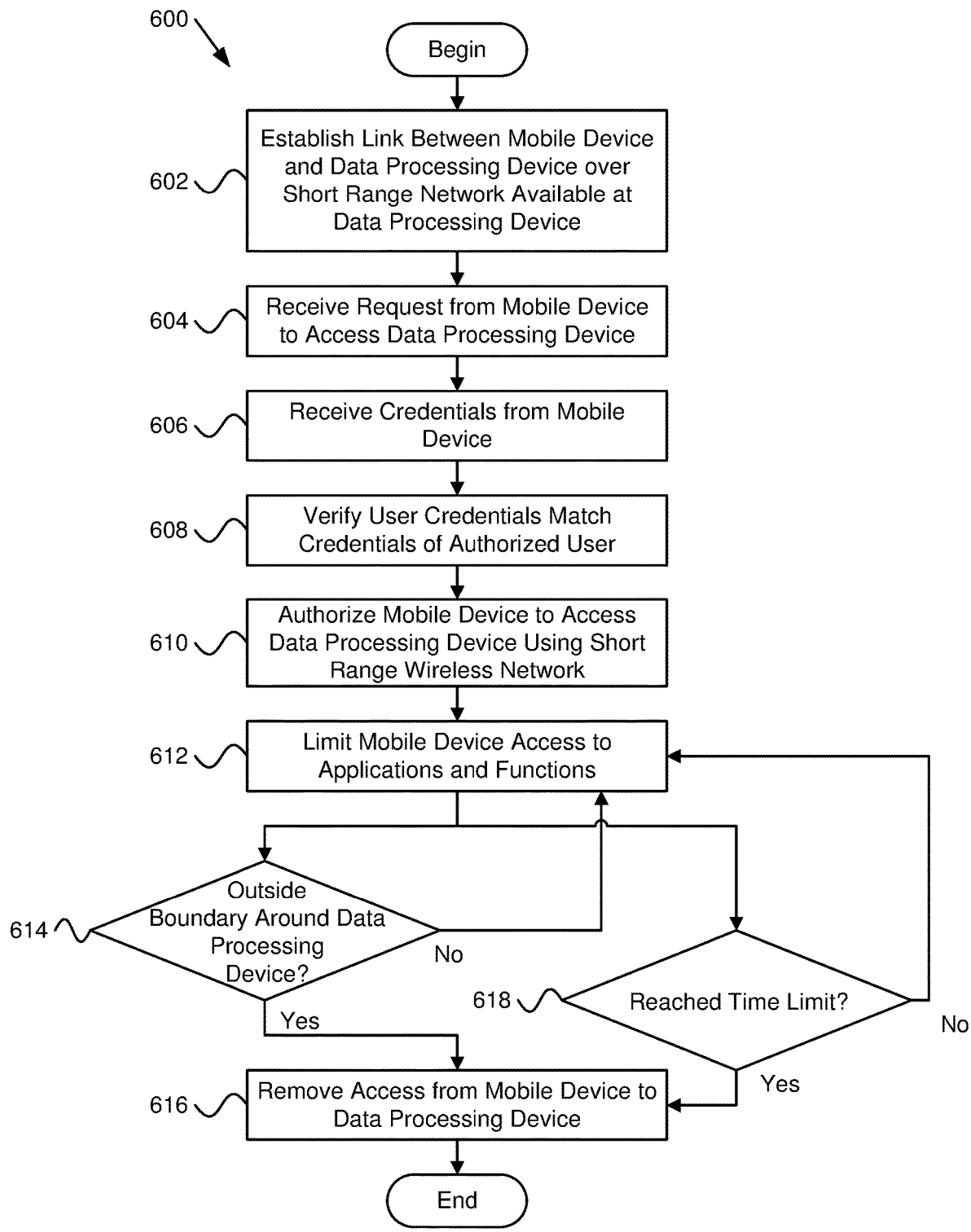
FIG. 6 is a schematic flow chart diagram illustrating a third embodiment of a method for multifactor identification of a mobile device for access to data processing devices within a secured data center.

FIG. 6 is a schematic block diagram illustrating a third embodiment of a method 600 for multifactor identification of a mobile device 108 for access to data processing devices 110 within a secured data center 106. The method 600 begins and establishes 602 a link between the mobile device 108 and the data processing device 110 over a short range wireless network (e.g. the wireless connection 120). The short range wireless network may be BLUETOOTH®, NFC, or other wireless network where the mobile device establishing a link verifies proximity between the mobile device 108 and the data processing device 110. In some embodiments, the method 600 establishing 602 a link over a short range wireless network is limited to verifying credentials of an authorized user and the mobile device 108 and/or receiving a request to access the data processing device 110 until proximity and credential verification is established.

The method 600 receives 604 a request from a mobile device 108 to access a data processing device 110. The method 600 may receive 604 the request over a short range wireless network available at the data processing device 110 or over another network. The method 600 receives 606 user credentials from the mobile device 108 and verifies 606 that the received user credentials match credentials of an authorized user. In one embodiment, the method 600 receives 606 the user credential over the short range wireless network (e.g. 120). In another embodiment, the method 600 receives 606 the user credentials over another network, such as the internal computer network 124. In another embodiment, the method 600 receives 606 the user credentials over a wired connection.

The method 600 authorizes 610 the mobile device 108 to access the data processing device 110 over the short range wireless network in response to verifying 608 that the user credentials match credentials of an authorized user and in response to receiving the user credentials. The method 600 limits 612 access of a user of the mobile device 108 to applications and/or functions of the mobile device 108.

The method 600 determines 614 if the mobile device 108 is outside a boundary around the data processing device 110. If the method 600 determines 614 that the mobile device 108 is not outside the boundary, the method 600 continues to limit 612 access by a user of the mobile device 108 to applications, functions, etc. of the mobile device 108. If the method 600 determines 614 that the mobile device 108 is outside the boundary, the method 600 removes 616 access from the mobile device 108 to access the data processing device 110, and the method 600 ends.

While determining 614 if the mobile device 108 is outside the boundary, the method 600 also determines 618 if a time limit is reached. If the method 600 determines 618 that the time limit has not been reached, the method 600 continues to limit 612 access by a user of the mobile device 108 to applications, functions, etc. of the mobile device 108. If the method 600 determines 618 that the time limit is reached, the method 600 removes 616 access from the mobile device 108 to access the data processing device 110, and the method 600 ends. The method 600 may be implemented, in some embodiments, by the receiver module 202, the credential module 204, the proximity module 206, the authorization module 208, the connection module 308, the authorization data module 310, the network verification module 312, the GPS module 314, the app limit module 316, the stop module 318, the limit module 320, the control module 322, the time module 324, and/or the perimeter module 326.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor of a secured server;
   a memory that stores code executable by the processor to:
   receive from a mobile device a request for authorization to access a data processing device located within a secured data center;
   verify that user credentials received from the mobile device in conjunction with the authorization request match credentials of an authorized user, the authorized user being authorized to access the data processing device;
   verify that the mobile device is in proximity to the data processing device;
   authorize a user of the mobile device to access the data processing device through the mobile device in response to verifying the user credentials match credentials of an authorized user and verifying that the mobile device is in proximity to the data processing device; and
   execute a limiting application on the mobile device to limit communication capability of the mobile device in response to authorizing the mobile device to access the data processing device, wherein the limit application limits, from within the mobile device, communication between the mobile device and a device outside of the secured data center.

2. The apparatus of claim 1, wherein verifying that the mobile device is in proximity to the data processing device comprises:
   receiving, from the mobile device, proximity information; and
   verifying that the accessed proximity information is available at the data processing device.

3. The apparatus of claim 2, wherein the proximity information available at the data processing device is available on an electronic display.

4. The apparatus of claim 2, wherein the proximity information available at the data processing device is dynamic and changes over time.

5. The apparatus of claim 1, wherein verifying that the mobile device is in proximity to the data processing device comprises the mobile device connecting to a network available at the data processing device, the network comprising one of a wireless network available at the data processing device and a wired connection to the data processing device.

6. The apparatus of claim 5, wherein verifying that the mobile device is in proximity to the data processing device comprises one or more of:
   linking the mobile device to the network;
   receiving authorization data from the mobile device over the network; and
   verifying over the network that the user credentials received from the mobile device in conjunction with the authorization request match credentials of the authorized user.

7. The apparatus of claim 5, wherein the wireless network comprises one or more of:
   a wireless network with a range of a specified distance from the data processing device;
   a radio frequency identification ("RFID") tag readable by the mobile device; and
   a wireless network available within the secured data center, wherein a location of the mobile device within the secured data center is transmitted over the network.

8. The apparatus of claim 1, wherein verifying that the mobile device is in proximity to the data processing device comprises using information from a global positioning satellite ("GPS") to determine a location of the mobile device.

9. The apparatus of claim 1, wherein verifying user credentials received from the mobile device in conjunction with the authorization request match credentials of an authorized user comprises one or more of:
receiving a username and a password from the mobile device and matching the username and password with the username and password of an authorized user;
receiving a data token from the mobile device and using data from the data token to authenticate an authorized user; and
receiving biometric data from the mobile device and matching the biometric data with corresponding biometric data of an authorized user.

10. The apparatus of claim 1, wherein authorizing the mobile device to access the data processing device comprises one or more of:
authorizing the mobile device for a period of time; and
authorizing the mobile device until the mobile device is beyond a perimeter.

11. The apparatus of claim 1, wherein authorizing the mobile device to access the data processing device further comprises limiting functionality of the mobile device.

12. The apparatus of claim 11, wherein limiting functionality of the mobile device comprises one or more of:
limiting access to one or more applications running on or executable on the mobile device;
stopping execution of one or more running applications on the mobile device;
limiting access to one or more functions of the mobile device; and
executing a limiting application on the mobile device that limits access to one or more of an application running on the mobile device and a function of the mobile device.

13. The apparatus of claim 1, wherein authorizing the mobile device to access the data processing device further comprises starting an application that allows one or more of access and control of the data processing device.

14. A method comprising:
receiving from a mobile device a request for authorization to access a data processing device within a secured data center;
verifying that user credentials received from the mobile device in conjunction with the authorization request match credentials of an authorized user, the authorized user being authorized to access the data processing device;
verifying that the mobile device is in proximity to the data processing device;
authorizing a user of the mobile device to access the data processing device through the mobile device in response to verifying the user credentials match credentials of an authorized user and verifying that the mobile device is in proximity to the data processing device; and
executing a limiting application on the mobile device to limit communication capability of the mobile device in response to authorizing the mobile device to access the data processing device, wherein the limit application limits, from within the mobile device, communication between the mobile device and a device outside of the secured data center.

15. The method of claim 14, wherein verifying that the mobile device is in proximity to the data processing device comprises one or more of:
receiving, from the mobile device, proximity information, and verifying that the accessed proximity information is available at the data processing device; and
the mobile device connecting to a network available at the data processing device, the network comprising one of a wireless network available at the data processing device and a wired connection to the data processing device.

16. The method of claim 14, wherein verifying user credentials received from the mobile device in conjunction with the authorization request match credentials of an authorized user comprises one or more of:
receiving a username and a password from the mobile device and matching the username and password with the username and password of an authorized user;
receiving a data token from the mobile device and using data from the data token to authenticate an authorized user; and
receiving biometric data from the mobile device and matching the biometric data with corresponding biometric data of an authorized user.

17. The method of claim 14, wherein authorizing the mobile device to access the data processing device comprises one or more of:
authorizing the mobile device for a period of time;
authorizing the mobile device until the mobile device is beyond a perimeter; and
limiting functionality of the mobile device.

18. A program product comprising a non-volatile computer readable storage medium that stores code executable by a processor, the executable code comprising code to:
receive from a mobile device a request for authorization to access a data processing device within a secured data center;
verify that user credentials received from the mobile device in conjunction with the authorization request match credentials of an authorized user, the authorized user being authorized to access the data processing device;
verify that the mobile device is in proximity to the data processing device;
authorize a user of the mobile device to access the data processing device through the mobile device in response to verifying the user credentials match credentials of an authorized user and verifying that the mobile device is in proximity to the data processing device; and
execute a limiting application on the mobile device to limit communication capability of the mobile device in response to authorizing the mobile device to access the data processing device, wherein the limit application limits, from within the mobile device, communication between the mobile device and a device outside of the secured data center.

* * * * *